(12) United States Patent
Schreurs

(10) Patent No.: US 9,955,674 B2
(45) Date of Patent: May 1, 2018

(54) UPDATING OF ANIMAL MANAGEMENT LABELS

(71) Applicant: N.V. Nederlandsche Apparatenfabriek NEDAP, Groenlo (NL)

(72) Inventor: Bernard Jan Gerrit Schreurs, Groenlo (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 32 days.

(21) Appl. No.: 14/882,826

(22) Filed: Oct. 14, 2015

(65) Prior Publication Data
US 2016/0106070 A1    Apr. 21, 2016

(30) Foreign Application Priority Data

Oct. 15, 2014  (NL) .................................... 2013640

(51) Int. Cl.
*A01K 29/00*    (2006.01)
*H04L 12/26*    (2006.01)
(Continued)

(52) U.S. Cl.
CPC .......... *A01K 29/005* (2013.01); *A01K 11/004* (2013.01); *A01K 11/006* (2013.01); *A01K 11/007* (2013.01); *G06K 7/10475* (2013.01); *G06K 17/00* (2013.01); *G06K 19/0723* (2013.01); *H04L 29/14* (2013.01);
(Continued)

(58) Field of Classification Search
CPC .. A01K 29/005; A01K 11/004; A01K 11/006; G06K 19/0723
See application file for complete search history.

(56) References Cited

U.S. PATENT DOCUMENTS 5,835,721 A    11/1998  Donahue et al.
2002/0158765 A1*  10/2002  Pape .................... A01K 29/005
                                                    340/573.3
(Continued)

FOREIGN PATENT DOCUMENTS

EP    1 489 501 A1    12/2004
EP    1 643 413 A2     4/2006

OTHER PUBLICATIONS

European Search Report dated Mar. 14, 2016.
Dutch Search Report dated Jun. 3, 2015.

*Primary Examiner* — Hongmin Fan
(74) *Attorney, Agent, or Firm* — Jacobson Holman, PLLC.

(57) ABSTRACT

A system comprising an animal management label, a pedometer, each provided with a transmitter and receiver device, and a smart tag for detecting movements of an animal provided therewith. The system comprises a plurality of readers for wirelessly reading out the label, and a central computer configured for communication with the readers. The system is configured for updating the label. The central computer is configured to supply update data the readers. A random one of the readers transmits the update data when the label is within wireless reading distance.
The system comprises recording means for keeping a record of data received by the label. The random one of the readers resumes transmitting update data within, which update data according to the recording means was not yet received by the label.

22 Claims, 2 Drawing Sheets

(51) Int. Cl.
*A01K 11/00* (2006.01)
*G06K 7/10* (2006.01)
*G06K 17/00* (2006.01)
*G06K 19/07* (2006.01)
*H04L 29/14* (2006.01)
*H04W 4/00* (2018.01)

(52) U.S. Cl.
CPC .. *H04L 43/0811* (2013.01); *G06K 2017/0041* (2013.01); *H04W 4/008* (2013.01)

(56) References Cited

U.S. PATENT DOCUMENTS

| | | | |
|---|---|---|---|
| 2006/0106806 A1 | 5/2006 | Sperling et al. | |
| 2009/0115578 A1* | 5/2009 | Geissler | H04Q 9/00 340/10.1 |
| 2009/0187392 A1* | 7/2009 | Riskey | A01K 11/007 703/11 |
| 2010/0251007 A1 | 9/2010 | Moore et al. | |
| 2010/0253521 A1* | 10/2010 | Williams, Sr. | G06Q 10/06 340/572.1 |
| 2012/0326874 A1* | 12/2012 | Kwak | A01K 11/006 340/573.3 |

* cited by examiner

UPDATING OF ANIMAL MANAGEMENT LABELS

BACKGROUND OF THE INVENTION

More particularly, the invention relates to a system comprising at least one animal management label, such as an ear tag or bolus provided with a transmitter and receiver device, a pedometer provided with a transmitter and receiver device, and a smart tag for detecting movements of the animal provided with a transmitter and receiver device, wherein the system further comprises a plurality of readers for wirelessly reading out the label, and a central computer which is communicatively connected with the readers.

Such a system is known per se. The transmitter and receiver device can be an active transmitter and receiver device which is supplied from a battery. It is also possible, however, that the transmitter and receiver device is implemented as an RFID label which responds when introduced into an interrogation field of a reader. Animal management labels are worn by an animal and are, for instance, attached to the neck or the leg of an animal. Also, it is known to attach such labels in the form of an ear stud or ear tag to the animal. In addition, such labels in the form of a bolus may be deployed in the stomach of an animal. This makes it cumbersome to provide such an animal management label with an update, for updating a label may take relatively much time and updating is difficult precisely when a label is attached to an animal, when it is undesirable to deprive the animal of its freedom of movement, or to separate the label from the animal. Wired updating of such a label is typically not possible either, because a management label is typically not provided with a terminal or connector, such as a USB connector.

BRIEF SUMMARY OF THE INVENTION

The invention contemplates providing a solution to the problem mentioned.

The system according to the invention is accordingly characterized in that the system is configured for updating the label with new data such as setting parameters of the label and/or a software update of the label, wherein the central computer is configured to supply the data of the update to each of the readers, wherein:
a. the system is configured such that a random reader of the plurality of readers starts wirelessly transmitting data of the update to a label when the label is at such a distance from the respective reader that the label can be wirelessly read out by the respective reader and the label has not received any data of the update yet;
b. the system comprises recording means, wherein the system is configured to keep record of information in the recording means about what part of the data of the update has been received by the respective label after the transmitting of data of an update to the label by a reader; and
c. the system is configured such that a random reader of the plurality of readers starts further wirelessly transmitting data of the update to the label when the label is at such a distance from the respective reader that the label can be wirelessly read out by the respective reader and according to the information which is stored in the recording means the label has not received all data of the update yet, wherein the data of the update that is then transmitted to the label concerns data of the update that has not been received by the label before.

According to the invention, it is thus possible to have an update executed wirelessly, spread over different readers and spread in time. As soon as the animal management label is in the vicinity of a random reader, updating can be started. If before updating is finished the animal walks away from the reader so that updating is discontinued, wireless updating, in accordance with the invention, can be continued when the animal happens to come near a random other reader. Even then, it is not necessary that the update be completed. When the animal moves away from this reader also, wireless updating can be continued again at a random other reader. This can repeat itself until a complete update has been supplied to the label. If a random reader reads out information from the recording means whereby it appears from the information read out that the label has already received all data of the update, the respective reader will not proceed to transmit any data of the update to the label.

In particular, it holds that each label is provided with recording means in which for the respective label information is stored about what part of the data of an update has already been received by the respective label. According to this embodiment, therefore, it holds that each label is provided with its own recording means to keep record of what part of the data of an update has already been received by the respective label. The system is so configured that this information is brought up to date each time after the label has received at least a part of the data of the update.

According to another variant, however, it holds that a central computer is provided with the recording means and that each label is provided with an identification code readable by a random reader, wherein the system is configured such that a random reader of the plurality of readers starts wirelessly transmitting data of an update to a label when the label is at such a distance from the respective reader that the label can be wirelessly read out by the respective reader and the label has not received any data of the update yet, wherein the system is furthermore configured such that the reader reads out the identification code of the label and supplies the identification code associated with information about what part of the data of an update has already been received by the label from the respective reader, to the recording means; and wherein the system is configured such that a random reader of the plurality of readers reads out an identification code of the label when the label is at such a distance from the respective reader that the label can be wirelessly read out and wherein the system is configured such that the reader starts further wirelessly transmitting data of the update to the label when, on the basis of the read-out identification code of the label and the information which is stored in the recording means, it appears that a part of the data of an update has not been received by the label yet, wherein the data of the update that is thereupon transmitted to the label relates to data of the update that has not been received by the label yet and wherein thereupon, again, in the central computer information is stored, associated with the identification code, about what part of the data of the update has been received by the label. In that case, in the central computer, a record is kept, per label, on the basis of the identification code of the label, of what part of an update the respective label has already received. It is noted here that it generally holds that when in this application it is indicated that in the recording means a record is kept of what part of the data of the update has been received by the respective label, this is understood to be equivalent to recording information in the recording means about what part of the data of the update has not been received by the respective label yet.

The invention also relates to a method for updating at least one animal management label, such as an ear tag or bolus provided with a transmitter and receiver device, a pedometer provided with a transmitter and receiver device, and a smart tag for detecting movements of the animal provided with a transmitter and receiver device, wherein use is made of a plurality of readers for wirelessly reading out the label, wherein the label is updated with new data such as setting parameters of the label and/or a software update of the label, characterized in that the method comprises the following steps:
a. a random reader of the plurality of readers starts wirelessly transmitting data of an update to a label when the label is at such a distance from the respective reader that the label can be wirelessly read out by the respective reader and the label has not received any data of the update yet and wherein thereupon step b. is carried out;
b. after the wirelessly transmitting of data of an update to the label by a random reader, it is recorded what part of the data of the update has already been received by the label; and
c. a random reader of the plurality of readers starts further transmitting data of the update to the label when the label is at such a distance from the respective reader that the label can be wirelessly read out by the respective reader and it appears from the recorded information that the label has not received all information about the update yet, wherein the information which is thereupon supplied to the label relates to information of the update which has not been received by the label yet and wherein thereupon step b. is carried out.

In particular, it holds here that in step b. it is recorded in the label what part of the data of an update has already been received by the label. Here, it then holds furthermore, in particular, that in step c., when the label is at such a distance from a random reader that the label can be read out by the reader, the label transmits information to the reader about what part of data of the update the label has already received and whereafter the reader starts wirelessly transmitting data of the update to the label that the label has not received from a reader yet, after which thereupon step b. is carried out.

According to an alternative embodiment of the method, it holds that in step b. it is recorded in a central computer what part of the data of an update has already been received by a label together with an identification code of a label, wherein:
in step a. a random reader reads out an identification code of a label when the label is at such a distance from the reader that the label can be read out by the reader, wherein the reader passes the read-out identification code to the central computer and wherein the reader starts wirelessly transmitting data of the update to a label when it appears from the information stored in the central computer that the label has not received any information about the update yet;
wherein in step b. after supplying data of an update, the reader which has supplied data of an update to the label supplies the identification code of the label, associated with information about what part of the data has already been received by the label, to the central computer;
wherein in step c. a random reader reads out an identification code of a label and passes it to the central computer, wherein the reader thereupon starts transmitting data of the update information to a label when it appears from the information stored in the central computer that the label has not received all data of the update yet, wherein the information that is supplied to the label relates to data of the update that has not been received by the label yet, and wherein after the transmitting of data about the update to the label by the reader, step b. is carried out.

According to the method, it may hold, furthermore, that the data of an update can be sent from a central computer to each of the readers, so that the readers have the data for the respective update available. The supply of a complete update to the respective readers from the central computer can be carried out via a local network or through the Internet. It is also conceivable, however, that from the central computer the complete update is placed on a memory stick or other data carrier such as a DVD, after which the respective data carrier is communicatively connected with a reader to supply the total update to the reader so that it is in readiness when an animal management label is in the vicinity of the respective reader and the label can be read out by the reader and hence also data of the update can be supplied to the respective label. It is hence possible that this data can be received by the respective readers beforehand in the form of a complete update, so that each reader has a complete update in readiness. It is also possible, however, that the portion of an update that a reader supplies to the animal management label is retrieved from the central computer by the reader real-time or almost real-time. In effect, the reader is then an extension piece of the central computer, whereby the update data that is transmitted to a label is retrieved from the central computer at least practically real-time. Both variants are therefore possible. Also for the method, it holds that in step b. it is recorded what part of the data of the update has already been received by the label. In the context of this application, this is equivalent to recording what part of the data of an update has not been received by the label yet.

BRIEF DESCRIPTION OF THE SEVERAL VIEWS OF THE DRAWINGS

The invention will now be further elucidated with reference to the drawings. In the drawings.

DETAILED DESCRIPTION OF THE INVENTION

Figure 1:
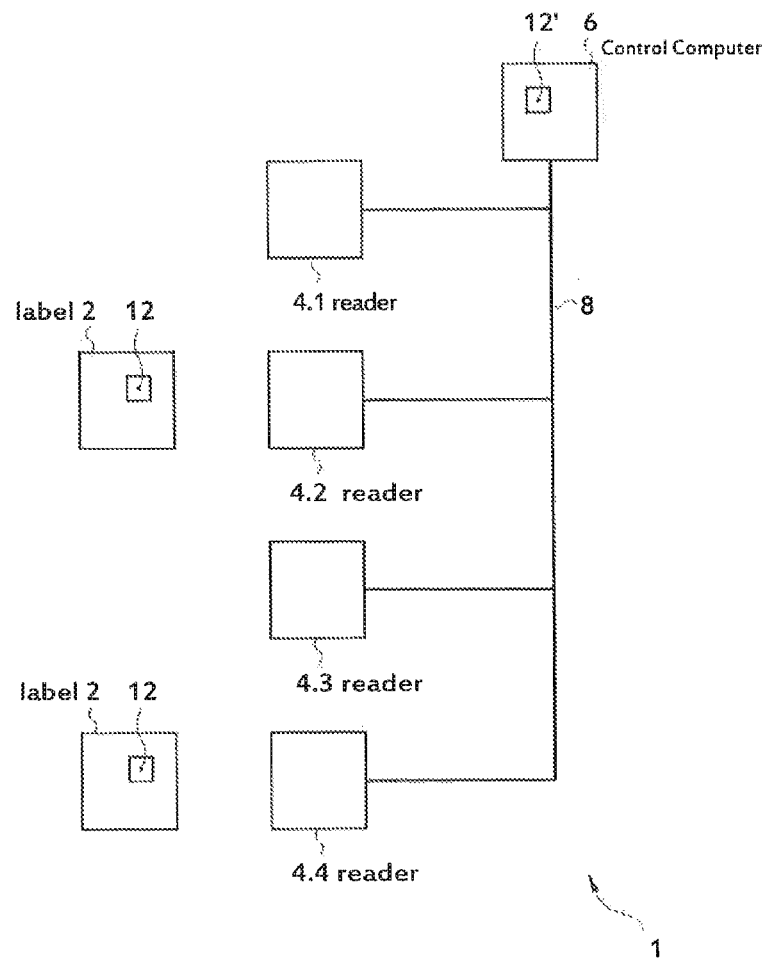
FIG. 1 shows a first embodiment of a system according to the invention.

In FIG. 1, with reference numeral 1 a system according to the invention is denoted. The system comprises at least one animal management label. This animal management label may for instance be implemented as an ear tag or a bolus provided with a transmitter and receiver device. The animal management label may also be implemented as a pedometer or step counter provided with a transmitter and receiver device. Also, it is conceivable that the animal management label is provided with a smart tag for detecting movements of the animal and is provided with a transmitter and receiver device. The transmitter and receiver device can be an active transmitter and receiver device which is supplied from a battery. It is also possible, however, that the transmitter and receiver device is implemented as an RFID label which responds when introduced into an interrogation field of a reader.

The system is furthermore provided with a plurality of readers $4.i$ ($i=1, 2, 3, 4$). Each reader $4.i$ is configured for wirelessly reading out the label in a manner known per se. To this end, the reader may be provided with a transmitter and receiver device for transmitting an electromagnetic interrogation field to which a label responds when introduced into this interrogation field. To this end, the label may be provided with the earlier-mentioned RFID label, or an active transmitter and receiver device. Both variants fall within the scope of the invention. The response of the label to the interrogation field of a reader may for instance comprise the transmitting of an electromagnetic response signal, the response signal comprising information about an identification code of the respective label.

The system is further provided with a central computer 6 which is, or can be, communicatively connected with the readers via a communicative connection 8. The communicative connection 8 is represented schematically in the drawing. The central computer is configured to supply the data of the update to each of the readers. In this example, the communicative connection 8 is for instance formed by a local area network of a farm, while the central computer 6 is a central farm computer which is configured to supply an update to each of the readers via the communicative connection 8. In this example, the data of a complete update is supplied to each of the readers 4.*i*. The update itself may, for instance, have been inputted beforehand at the central computer 6 in that, for instance, it has been supplied beforehand by a manufacturer of the animal management labels, for instance by means of a storage medium such as a memory stick or a DVD, or via the Internet. As will be discussed hereinafter, however, other variants are also conceivable. In this example, however, the situation is that at some point in each of the readers 4.*i* a complete update for the animal management labels is in readiness. The system 1 is configured such that, as soon as in this example the animal management label 2 is at an appropriate distance from a random reader, the label can be wirelessly read out by the respective reader, in this example the reader 4.4. The reader 4.4 starts wirelessly transmitting data of the update to the label 2. In this example, it holds that each of the labels is provided with recording means 12 in which, for the respective label, information is stored about what part of the data of an update has already been received by the respective label. In this example, therefore, in label 2 information is stored about what part of an update the label has received from the reader 4.4. The system is configured such that a random reader, in this example the reader 4.4, of the plurality of readers, starts wirelessly transmitting the data of the update to the at least one label when the at least one label is at such a distance from the respective reader 4.4 that the at least one label can be wirelessly read out by the respective reader and according to the information which is stored in the recording means of the label 2 the at least one label has not received any data of the update yet. The reader 4.4 hence reads out the recording means of the label 2 and when it appears from the information stored in the recording means of the label 2 that the label has not received any data of the update yet, the reader 4.4 starts transmitting data of the update to the label 2. When the label 2 during the wireless reception of data of the update is moved away from the reader 4.4, for instance because the label is worn by an animal that walks away, updating will have to stop at some point. When updating stops, it is recorded in the recording means of the label what part of the data of the update the respective label has already received. When subsequently it happens to be so that the label, because the animal comes into the vicinity of the reader 4.2, can be read out by the reader 4.2, the reader 4.2 will retrieve from the recording means of the label 2 the information about what part of an update has already been received by the respective label 2.

After this, the reader 4.2 will continue the updating of the label 2 whereby the data of the update that is then transmitted to the label relates to data of the update that has not been received by the reader 4.2 before. When updating by the reader 4.2 is ended because the update is finished or because the label 2 is moving to a position outside the range of the reader 4.2 so that the label 2 can no longer be read out and so that it is no longer possible either to supply data of the update to the label 2 wirelessly, updating is stopped and again it is stored in the recording means of the label what part of the data of the update has been received by the respective label after the supply of the data of the update to the label. This may then also relate to the reception of the complete update. When, presently, not the complete update has been received yet, updating will be continued in the same manner as discussed above when the label is in the vicinity of one of the four readers 4.*i*. In this manner, spread in time, a complete update can be carried out through different readers through the use of a combination of a plurality of readers. An advantage is that an animal wearing the label 2 can move freely as use is made of periods when the animal happens to be in the vicinity of a reader, so that the respective label worn by the animal can be read out by the respective reader and the transmission of data of an update to the respective label can be started, or continued, or completed. If a random reader reads out information from the recording means of the label whereby it appears from the information read out that the label 2 has already received all data of the update, the respective reader will not proceed to transmit any data of the update to the label.

In this example, the data of a complete update was supplied to each of the readers 4*i*. It is also possible, however, that the data of the complete update is present only in the central computer 6. This means that when the label 2, as discussed above, is in the vicinity of the reader 4.4, the reader 4.4 proceeds to retrieve the data of the update from the central computer 6 and transmits the same to the label 2. The reader 4.4 hence retrieves the data of the update at the central computer real-time, to then supply the same wirelessly, at least substantially simultaneously, to the label 2.

When, as discussed above, the label 2 subsequently finds itself in the vicinity of the reader 4.2, the reader 4.2 can resume updating by retrieving the next data of the update at the central computer 6 and passing the same wirelessly to the label 2 real-time. Such variants are understood to be within the scope of the invention.

In the example discussed above, each label was provided with recording means in which for the respective label information was stored about what part of the data of an update had already been received by the respective label.

In an alternative embodiment, however, it holds that the recording means 12 are included not in each of the labels but in the central computer 6. These recording means are designated with reference numeral 12'. In that case, it is essential that each label be provided with a unique identification code. In this example, this works as follows.

When the label 2 is in the vicinity of the reader 4.4, the reader 4.4 will read out the identification code of the label 2. Thereupon, on the basis of information stored in the recording means 12', it is checked whether the label 2 has already received data of a particular update. This information comprises an identification code of a label associated with information about what part of an update the label has received. This can be done in that the reader 4.4 via the communicative connection enters into communication with the central computer 6. When by consultation of the recording means it appears that the label with the respective identification code has not received any data of the update yet, the reader 4.4 starts transmitting data of the update to the label 2. As discussed above, it may be so that a complete update is in readiness in each of the readers 4.i. It is also possible, however, that in this example the reader 4.4 retrieves the data for updating from the central computer 6 real-time to thereupon transmit the same to the respective label. When the updating of the label 2 is ended, for instance because the update is finished or because the label 2 moves outside the range of the reader 4.4, the reader 4.4 will pass on to the recording means 12' via the communicative connection 8 what part of the update the label 2 has already received. Information about this, associated with the identification code of the label, is stored in the recording means 12'. This information can hence be that a particular part of the update has already been received by the label 2, which, within the framework of this application, is equivalent to what part of the update has or has not been received by the label, or that a complete update has been received by the label 2. When the label 2 has not received a complete update yet and a while later is in the vicinity of the reader 4.2, the reader 4.2 will read out the identification code of the label 2. Thereupon, the reader 4.2 checks on the basis of the information stored in the recording means 12' to what extent the label with the respective identification code has already received data of the update. When it appears that the label has not received all data of an update yet, the reader 4.2 will start transmitting data of the update that the label has not received before. Here, too, it holds that it may be so that for the purpose of transmission of data of the update by the reader 4.2, the complete update is in readiness in the reader 4.2 or that the reader 4.2 for the purpose of transmission of data of the update retrieves data of the update at the central computer 6 real-time when the complete update is in readiness there. When a complete update has thus been supplied to the label 2, and when the label 2 next finds itself at such a distance from the reader 4.1 that the latter can read out the label 2, the reader 4.1 will read out the identification code of the label 2. Thereupon, the reader 4.1 checks on the basis of the recording means 12' whether the label 2 has already received a complete update. In this case, this will then prove to be actually so, so that the reader 4.1 will not transmit any new data of the respective update to the label 2.

In this example, only one label is shown, but in practice the system will be provided with a plurality of such labels where each label may be provided with recording means to save information about what part of the data of an update the respective label has already received. It is also possible, however, that of a plurality of labels the identification codes of the respective labels, associated with the respective parts of an update the respective labels have already received, are stored in the recording means 12'. In this example, it holds that the system is configured such that, in use, in step a. the respective random reader 4.i (1, 2, 3, 4) starts transmitting data of the update to the label 2 when an amplitude of a response signal of the label that is received by the respective random reader is greater than a predetermined first threshold value. In the example of FIG. 1, therefore, this concerns label 2 which is near reader 4.4. Naturally, transmission of the data of the update is started only when it appears from the recording means that the label has not received all data of the update yet.

Furthermore, it holds in this example that the system is configured such that, in use, in step c. the respective random reader starts further transmitting data of the update to the label when an amplitude of a response signal of the label that is received by the random reader is greater than a predetermined second threshold value. In the example of FIG. 1, therefore, this concerns label 2 which, a while later, is near reader 4.2. Here, according to a particular embodiment, the first threshold value can be equal to the second threshold value. Naturally, transmission of the data of the update is started only when it appears from the recording means that the label has not received all data of the update yet.

Figure 2:
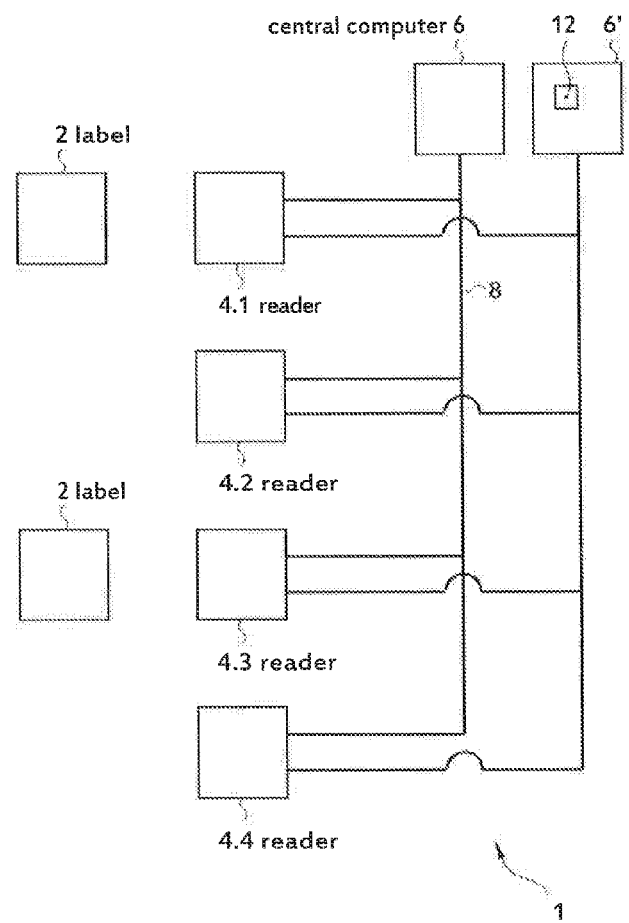
FIG. 2 shows a second embodiment of the system according to the invention.

In FIG. 2 an alternative embodiment of the system according to FIG. 1 is shown, corresponding parts in FIG. 1 and FIG. 2 being provided with the same reference numerals.

The system of FIG. 2 is again provided with a first central computer 6 in which the data of a complete update are included. As discussed with reference to FIG. 1, these data of a complete update may be supplied beforehand via the communicative connection 8 to each of the readers 4.i, so that in each reader a complete update is in readiness. The communicative connection 8 can then be a local area network, an Internet connection, or a connection of a different kind. It is also possible, however, that the communicative connection 8 stands for a schematic connection in the form of a data carrier such as a memory stick. The data can then be loaded from the computer 6 onto the memory stick, after which the memory stick is then connected with the reader 4.1 to load the data of a complete update into the reader 4.1. Also, with the same memory stick or another data carrier, the data of an update is supplied to the readers 4.2 and 4.3 and 4.4, respectively. It is also possible, however, as discussed above, that the data of an update is supplied real-time to a reader 4.i via the communicative connection 8 when the reader supplies this data to the label 2. The system according to FIG. 2, however, differs from the system according to FIG. 1 in that the system according to FIG. 2 is provided with a second central computer 6' in which the recording means 12 are included. The recording means 12 which are included in the second central computer 6' have a similar function to the recording means 12 which are included in the central computer 6 of the system according to FIG. 1. The difference, however, is that in the system of FIG. 2 the complete update on the one hand and the recording means 12 on the other are in mutually different computers, whereas in the system of FIG. 1 the recording means 12 are either in each of the labels or in the central computer 6. The operation of the system according to FIG. 2 is otherwise analogous to that discussed with reference to the system of FIG. 1. It is noted that in the example of FIG. 1 the central computer 6 is a farm computer. It is also conceivable, however, that the computer 6 is the computer of a manufacturer of the labels. The connection 8 may then be formed, for instance, by an Internet connection between the manufacturer and the farm where the readers 4.i are set up. Also, the connection 8 can again be formed by a data carrier, such as a memory stick, whereby the manufacturer of the labels puts the information from his computer 6 on a data carrier, sends this data carrier to a farm, after which on the farm with the aid of the data carrier a complete update is placed on each of the readers 4.i.

For each of the embodiments described, but also in general, it can hold according to the invention that a plurality of readers can simultaneously carry out step a. and/or step c. for a plurality of labels. In particular, it holds here that each label, when being updated in step a. or step c., is updated by just one of the readers (hence, not by a plurality of readers at the same time). Accordingly, for instance in FIG. 1, label 2 can be updated in step a. or step c. by reader 4.4 while simultaneously a label 2' is updated in step a. or step c. by reader 4.3.

With each of the embodiments described, but also in general, it can hold according to the invention that a random reader can simultaneously carry out step a. and/or step c. for a plurality of labels. In that case, the plurality of labels can, for instance by time-sharing, be updated in step a. and/or step c. by one of the readers. Accordingly, in, for instance, FIG. 1, label 2' may be updated in step a. or step c. by reader 4.3, while simultaneously a label 2" is updated in step a. or step c. by reader 4.3. Then it is furthermore possible that at the same time label 2 is updated in step a. or step c. by reader 4.4.

Such variants are each understood to fall within the scope of the invention.

The embodiment according to FIG. 1 in which the recording means 12 are in the labels may for instance be further configured as follows. Each label 2 at random times sends data to at least one reader 4.1 according to the ALOHA principle. The protocol that is used means that in a step 1) the label sends a message including SoftwareVersion, BuildVersion & Settings Version which are stored in a memory of the label 2 such as the recording means 12. The reader 4.i which receives this message can thus establish that the label runs on a Software version for which an update is available. In response, the reader 4.i, in this example reader 4.2, asks label 2 how many lines of the update it has already received. In response to this query, the label 2 will let the reader 4.2 know that no lines of the update have been received. In response to this, the reader 4.2 in a step 2) sends a message back to the label 2 including a first line of the update of the software (For the tag, it makes no difference from which reader 4.i this is done. It is obvious that the reader with the best reception may send this back. This is determined by the readers mutually, via the central computer. In this example, this is the reader 4.2.) When in this example the label 2 has received the first line from the reader 4.2, the label in a step 3) will send an acknowledgment of receipt (ack) to the reader 4.2 and store the line in a memory of the label, as, for instance, in the recording means 12. Also, it is stored in the recording means 12 that a first line of the update has been received. The reader will then in a new step 2) send the second line of the update. When the label 2 has received the second line of the update, the label, in a new step 3), will send an ack to the reader 4.2 again. Also, in the recording means 12 it will be stored that two lines of the update have been received. This process of repetition of step 2) and step 3) continues until the label has received all lines of the update. The reader 4.2 receives an ack to the effect that also the last line of the update has been received and then will not send any next lines anymore. The label 2 recognizes in a known manner that the update is complete and will check a checksum of the update and install the software when the checksum is right. When the new software has been installed, the label will be sending messages including the updated SoftwareVersion, Build Version & SettingsVersion which are stored in the recording means 12. A random reader 4.i receiving this then knows that the software is up to date and will not proceed to send any update.

When, however, halfway the execution of the update a step 2) or 3) fails because a connection between the label 2 and the reader 4.2 falls away, the system works as follows.

The label still, at random times, sends in step 1) messages including the old SoftwareVersion, BuildVersion & SettingsVersion which are stored in the recording means 12. A random reader 4.i receiving this, in this example reader 4.3, then knows that the software is not up to date. The reader 4.3 asks the label how many lines of an update it has already received. The label passes the number of lines to the reader 4.3. Upon receipt of this message, the reader proceeds to start a new step 2) in which the first next line of the update which has not been received by the label yet, is transmitted. The label acknowledges receipt of the new line in a step 3). Steps 2) and 3) are repeatedly carried out until the whole update has been received. If, however, updating is broken off again before the complete update has been received, the process such as it has been discussed above in respect of the breakoff of the update carried out by reader 4.2, repeats itself.

When the label does not receive an expected, next line after a while, the label in step 3) will transmit a message (nack) to the reader 4.2 to the effect that the next line has not been received. If the reader 4.2 can receive the nack, it will in response in a step 2) retransmit the missed line. The label can then in a step 3) transmit an ack so that the process of updating can continue as discussed above.

The embodiment according to FIG. 1 in which the recording means 12' are in the central computer may for instance be further configured as follows. Each label 2 sends random data to at least one reader 4.i according to the ALOHA principle. The protocol that is applied means that in a step 1) the label sends a message including SoftwareVersion, BuildVersion & SettingsVersion which are stored in a memory of the label 2 together with an ID of the label. The reader 4.i which receives this message can thus establish that the label runs on a Software version for which an update is available. The reader 4.i, in this example reader 4.2, in response asks the central computer how many lines of the update the label with the respective ID has already received. The central computer looks up this information in the recording means 12' and in response to this query will let the reader 4.2 know that no lines of the update have been received. In response, the reader 4.2 in a step 2) sends back a message to the label 2 including a first line of the update of the software (For the tag, it makes no difference from which reader 4.i this is done. It is obvious that the reader with the best reception may send this back. This is determined by the readers mutually, via the central computer. In this example, this is the reader 4.2.) When in this example the label 2 has received the first line from the reader 4.2, this label in a step 3) will send an acknowledgment of receipt (ack) to the reader 4.2 and store the line in a memory of the label. Upon receipt of the ack, the reader 4.2 will store in the recording means 12' that the respective label has received a first line of the update. The reader will then in a new step 2) send the second line of the update. When the label 2 has received the second line of the update, this label in a new step 3) will send an ack to the reader 4.2 again. Upon receipt of the ack, the reader 4.2 will store in the recording means 12' that two lines of the update have been received. This process of repetition of step 2) and step 3) continues until the label has received all lines of the update. The reader 4.2 receives an ack that also the last line of the update has been received and then will not send any next lines anymore. The reader 4.2 recognizes in a known manner that the update is complete and will check a checksum of the update and install the software when the checksum is right. When the new software has been installed, the label will proceed to send messages including the updated SoftwareVersion, BuildVersion & SettingsVersion which are stored in the recording means 12. A random reader 4.i which receives this, then knows that the software is up to date and will not send any update.

When, however, halfway the execution of the update a step 2) or 3) fails because a connection between the label 2 and the reader 4.2 falls away, the system works as follows.

The label still, at random times, sends in step 1) messages including the old SoftwareVersion, BuildVersion & SettingsVersion which are stored in a memory of the label. A random reader 4.*i* which receives this, in this example reader 4.3, then knows that the software is not up to date. The reader 4.3 asks the central computer 6 how many lines of an update the label 2 has already received. The central computer retrieves the respective information from the recording means 12' and passes the number of lines to the reader 4.3. The reader 4.3 then proceeds to start a new step 2) in which the first next line of the update that according to the central computer 6 has not been received by the label yet, is transmitted.

If the connection between the reader 4.2 and the label fell away after the label did receive a line but before it could send an ack, the label will receive from reader 4.3 a line which it had already received last from the reader 4.2. The label then sends an ack again in a step 3). Steps 2) and 3) are then repeatedly carried out until the whole update has been received. If, however, updating is broken off again before the complete update has been received, the process such as it has been discussed above in respect of the breaking off of the update carried out by reader 4.2, repeats itself.

If the connection between the reader 4.2 and the label fell away before the label could receive a line and before the label could transmit an ack or nack, the label will receive a line that it has not received before. The label then sends an ack again in a step 3). Steps 2) and 3) are then repeatedly carried out until the whole update has been received. However, if updating is broken off again before the complete update has been received, the process such as it has been discussed above in respect of the breaking off of the update carried out by reader 4.2, repeats itself.

When the label does not receive an expected, next line after a while, the label in step 3) will transmit a message (nack) to the reader that the next line has not been received. If the reader 4.2 can still receive the nack, it will, in response, in a step 2) retransmit the missed line. The label can then in a step 3) transmit an ack so that the process of updating can continue as discussed above.

In this example, the labels can communicate with the readers at 134 kHz or 433 MHz. However, other frequencies are also possible.

The invention claimed is:

1. A system comprising at least one animal management label in the form of an ear tag or bolus provided with a transmitter and receiver device, a pedometer provided with a transmitter and receiver device, or a smart tag for detecting movements of the animal provided with a transmitter and receiver device, wherein the system comprises a plurality of readers for wirelessly reading out the label, and a central computer which is communicatively connected with the readers, wherein the system is configured for updating the label with new data including setting parameters of the label and a software update of the label, wherein the central computer is configured to supply data of an update to each of the readers, wherein:
  a. the system is configured such that a random reader of the plurality of readers starts wirelessly transmitting the data of the update to the at least one label when the at least one label is at such a distance from the respective reader that the at least one label can be wirelessly read out by the respective reader and the at least one label has not received any data of the update yet;
  b. the system comprises recording means, wherein the system is configured to keep record of information in the recording means about what part of the data of the update has been received by the at least one label after the transmitting of data of the update to the at least one label by a random reader; and
  c. the system is configured such that a random reader of the plurality of readers starts further wirelessly transmitting the data of the update to the at least one label when the at least one label is at such a distance from the respective reader that the at least one label can be wirelessly read out by the respective reader and according to the information which is stored in the recording means the at least one label has not received all data of the update yet, wherein the data of the update that is then transmitted to the at least one label relates to data of the update that has not been received by the at least one label before.

2. The system according to claim 1, wherein the system is configured such that a random reader of the plurality of readers starts wirelessly transmitting the data of the update to the at least one label when the at least one label is at such a distance from the respective reader that the at least one label can be wirelessly read out by the respective reader and according to the information which is stored in the recording means the at least one label has not received any data of the update yet.

3. The system according to claim 1, wherein the at least one label is provided with recording means in which for the at least one label information is stored about what part of the data of the update has already been received by the at least one label.

4. The system according to claim 3, wherein the system is configured such that when the at least one label can be read out by a random reader, the at least one label transmits information to the reader about what part of the data of the update the at least one label has already received and whereafter the reader starts wirelessly transmitting to the at least one label data of the update that the at least one label has not received from a reader yet.

5. The system according to claim 1, wherein a central computer is provided with the recording means and that the at least one label is provided with an identification code readable by a random reader, wherein the system is configured such that a random reader of the plurality of readers reads out an identification code of the at least one label when the at least one label is at such a distance from the respective reader that the at least one label can be wirelessly read out and wherein the system is configured such that the reader starts transmitting data of the update to the at least one label when on the basis of the read-out identification code of the at least one label and the information which is stored in the recording means it appears that the at least one label has not received any data of the update yet;
  wherein the system is furthermore configured such that, after the at least one label has received data of the update from a random reader, the respective reader reads out the identification code of the at least one label and supplies the identification code associated with information about what part of the data of the update has already been received by the at least one label from the respective reader, to the recording means; and
  wherein the system is configured such that a random reader of the plurality of readers reads out an identification code of the at least one label when the at least one label is at such a distance from the respective reader that the at least one label can be wirelessly read out and wherein the system is configured such that the reader starts further transmitting data of the update to the at least one label when on the basis of the read-out identification code of the at least one label and the information which is stored in the recording means it appears that the at least one label has not received a part of the data of the update yet, wherein data of the update that is then transmitted to the at least one label relates to data of the update that has not been received by the at least one label yet.

6. The system according to claim 1, wherein the system is configured to, in use, supply the data of the update from a central computer to each of the readers.

7. The system according to claim 1, wherein the system is configured such that in use, in step a. the random reader starts transmitting data of the update to the at least one label when an amplitude of a response signal of the at least one label that is received by the random reader is greater than a predetermined first threshold value.

8. The system according to claim 1, wherein the system is configured such that, in use, in step c. the random reader starts further transmitting data of the update to the at least one label when an amplitude of a response signal of the at least one label that is received by the random reader is greater than a predetermined second threshold value.

9. The system according to claim 1, wherein the system is configured such that, in use, a plurality of readers can simultaneously carry out step a. and/or step c, for a plurality of labels.

10. The system according to claim 9, wherein the system is configured such that, in use, each label, when it is updated in step a. or step c., is updated by only one of the readers.

11. The system according to claim 1, wherein the system is configured such that, in use, a random reader can simultaneously carry out step a. and/or step c. for a plurality of labels.

12. A method for updating at least one animal management label in the form of an ear tag or bolus provided with a transmitter and receiver device, a pedometer provided with a transmitter and receiver device, and a smart tag for detecting movements of the animal provided with a transmitter and receiver device, wherein use is made of a plurality of readers for wirelessly reading out the at least one label, wherein the at least one label is updated with new data including setting parameters of the at least one label and a software update of the at least one label, wherein the method comprises the following steps:
  a. a random reader of the plurality of readers starts wirelessly transmitting data of an update to the at least one label when the at least one label is at such a distance from the respective reader that the at least one label can be wirelessly read out by the respective reader and the at least one label has not received any data of the update yet and wherein thereupon step b. is carried out;
  b. after the transmitting of data of an update to the at least one label by a reader, it is recorded what part of the data of the update has already been received by the at least one label; and
  c. a random reader of the plurality of readers starts further wirelessly transmitting data of the update to the at least one label when the at least one label is at such a distance from the respective reader that the at least one label can be wirelessly read out by the respective reader and it appears from the recorded information that the at least one label has not received all data of the update yet, wherein the data which is thereupon transmitted to the at least one label relates to data of the update that has not been received by the at least one label yet and wherein thereupon step b. is carried out.

13. The method according to claim 12, wherein in step a. the random reader of the plurality of readers starts wirelessly transmitting data of the update to the at least one label when the at least one label is at such a distance from the respective reader that the at least one label can be wirelessly read out by the respective reader and it appears from the recorded information that the at least one label has not received any data of the update yet.

14. The method according to claim 12, wherein in step b. it is recorded in the at least one label what part of the data of the update has already been received by the at least one label.

15. The method according to claim 14, wherein in step c. when the at least one label is at such a distance from a random reader that the at least one label can be read out by the reader, the at least one label transmits information to the reader about what part of the data of the update the at least one label has already received and whereafter the reader starts transmitting to the at least one label data of the update that the at least one label has not received from a reader yet, whereafter thereupon step b. is carried out.

16. The method according to claim 12, wherein in step b. it is recorded in a central computer what part of the data of the update has already been received by the at least one label, together with an identification code of the at least one label, wherein: in step a. a random reader reads out an identification code of the at least one label when the at least one label is at such a distance from the reader that it can be read out by the reader, wherein the reader passes the read-out identification code to the central computer and wherein the reader starts transmitting data of the update to the at least one label when it appears from the information stored in the central computer that the at least one label has not received any data of the update yet;
  wherein in step b. after the transmitting of data of the update the reader which has transmitted data of the update to the at least one label supplies the identification code of the at least one label associated with information about what part of the data of the update has already been received by the at least one label, to the central computer;
  wherein in step c. a random reader reads out an identification code of the at least one label and passes it to the central computer, wherein the reader thereupon starts transmitting data of the update to the at least one label when it appears from the information stored in the central computer that the label has not received all data of the update yet, wherein the data of the update that is transmitted to the label relates to data of the update that has not been received by the label yet and wherein after the transmitting of data of the update by the reader to the label step b. is carried out.

17. The method according to claim 12, wherein the data of the update is supplied from a central computer to each of the readers.

18. The method according to claim 12, wherein in step a. the random reader starts transmitting data of the update to the at least one label when an amplitude of a response signal of the at least one label that is received by the random reader is greater than a predetermined first threshold value.

19. The system according to claim 12, wherein in step c. the random reader starts further transmitting data of the update to the at least one label when an amplitude of a response signal of the at least one label that is received by the random reader is greater than a predetermined second threshold value.

20. The method according to claim 12, wherein a plurality of readers simultaneously carry out step a. and/or step c. for a plurality of labels.

21. The method according to claim 20, wherein each label, when it is updated in step a. or step c., is updated by just one of the readers.

22. The method according to claim 12, wherein a random reader simultaneously carries out step a. and/or step c. for a plurality of labels.

* * * * *